US012160719B2

(12) United States Patent
Ren et al.

(10) Patent No.: US 12,160,719 B2
(45) Date of Patent: Dec. 3, 2024

(54) COAXIAL SPEAKER

(71) Applicant: AAC Microtech (Changzhou) Co., Ltd., Changzhou (CN)

(72) Inventors: Zhang Ren, Shenzhen (CN); Qi Wang, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/914,355

(22) PCT Filed: Jul. 20, 2022

(86) PCT No.: PCT/CN2022/106762
§ 371 (c)(1),
(2) Date: Sep. 26, 2022

(87) PCT Pub. No.: WO2024/000694
PCT Pub. Date: Jan. 4, 2024

(65) Prior Publication Data
US 2024/0236578 A1 Jul. 11, 2024

(30) Foreign Application Priority Data
Jun. 30, 2022 (CN) ......................... 202221689851.8

(51) Int. Cl.
*H04R 9/02* (2006.01)
*H04R 1/24* (2006.01)
*H04R 7/18* (2006.01)

(52) U.S. Cl.
CPC ............... *H04R 9/025* (2013.01); *H04R 1/24* (2013.01); *H04R 7/18* (2013.01); *H04R 2400/11* (2013.01)

(58) Field of Classification Search
CPC . H04R 9/025; H04R 1/24; H04R 7/18; H04R 2400/11
USPC ......................... 381/412, 396, 117, 111, 150
See application file for complete search history.

(56) References Cited

U.S. PATENT DOCUMENTS

2023/0269538 A1* 8/2023 Shao ......................... H04R 1/24 381/412

* cited by examiner

*Primary Examiner* — Thjuan K Addy
(74) *Attorney, Agent, or Firm* — W&G Law Group

(57) ABSTRACT

A coaxial speaker includes a first sounding unit, a second sounding unit coaxial with and surrounded by the first sounding unit, and a magnetic circuit system including a bottom plate, a first magnetic unit and a second magnetic unit spaced apart from the first magnetic unit for forming a first magnetic gap for the first sounding unit. The second magnetic unit includes a second magnet in an annular shape, a second yoke in an annular shape attached to the second magnet, and a third magnet in an annular shape attached to the second yoke. The bottom plate is provided with a bending wall locating inside the second magnetic unit, the bending wall is spaced apart from the second magnetic unit for forming a second magnetic gap for the second sounding unit. The coaxial speaker can reduce a product height and a magnetic circuit system cost.

4 Claims, 3 Drawing Sheets

A-A

B-B

COAXIAL SPEAKER

FIELD OF THE PRESENT DISCLOSURE

The present disclosure relates to electroacoustic transducers, in particular to a coaxial speaker.

DESCRIPTION OF THE RELATED ART

A coaxial speaker means that a speaker has two sounding units emitting high frequency sounds and mid-low frequency sounds respectively and these two sounding units are set on the same axis.

A coaxial speaker in the related art has two sounding units stacked in a height direction, resulting in an excessive product height which reduces product applicability. In addition, each sounding unit has an individual and separate magnetic circuit system, resulting in an excessive magnetic circuit system cost which reduces product market competitiveness.

Thus, it is necessary to provide a novel coaxial speaker to solve the problem.

SUMMARY

An objective of the present disclosure is to provide a coaxial speaker which reduces a product height and a magnetic circuit system cost.

In order to achieve the objective mentioned above, the present disclosure discloses a coaxial speaker including a magnetic circuit system, a first sounding unit and a second sounding unit. The magnetic circuit system includes a bottom plate, a first magnetic unit and a second magnetic unit. The first magnetic unit includes a first magnet disposed on the bottom plate and a first yoke attached to the first magnet. The second magnetic unit is arranged on an inner side of the first magnetic unit and spaced apart from the first magnetic unit for forming a first magnetic gap, and includes a second magnet in an annular shape disposed on the bottom plate, a second yoke in an annular shape attached to the second magnet, and a third magnet in an annular shape attached to the second yoke. The bottom plate is provided with a bending wall locating inside the second magnetic unit, the bending wall is spaced apart from the second magnetic unit for forming a second magnetic gap. The first sounding unit includes a first diaphragm and a first voice coil locating in the first magnetic gap and driving the first diaphragm for vibrating and emitting sounds. The second sounding unit is coaxial with and surrounded by the first sounding unit, and includes a second diaphragm and a second voice coil locating in the second magnetic gap and driving the second diaphragm for vibrating and emitting sounds.

Further, the coaxial speaker includes a first frame for supporting the first diaphragm and a second frame for supporting the second diaphragm, an outer fixing part of the first diaphragm is fixed to the first frame, an inner fixing part of the first diaphragm is fixed to the third magnet, the second frame is fixed to the third magnet.

Further, the first yoke includes a main body part attached to a surface of the first magnet and an extension part extending from the main body part in a direction away from the second magnetic unit, the first frame is fixed to the extension part.

Further, the first sounding unit includes an elastic supporting member opposite to and spaced apart from the first diaphragm, and a skeleton connected between the first diaphragm and the elastic supporting member, an amount of the extension parts is two, the two extension parts are respectively arranged on two opposite long-axis sides of the coaxial speaker, an amount of the elastic supporting members is two, the two elastic supporting members are respectively arranged on two opposite short-axis sides of the coaxial speaker, the skeleton includes two supporting arms respectively fixed to the two elastic supporting members, each supporting arm is arranged between the first frame and the first magnetic unit, an outer fixing portion of each elastic supporting member is fixed to the first frame, an inner fixing portion of each elastic supporting member is fixed to a corresponding one of the two supporting arms.

Further, each elastic supporting member includes a flexible printed circuit board fixed to a corresponding one of the two supporting arms and an auxiliary diaphragm fixed to a bottom surface of the flexible printed circuit board away from the first diaphragm.

Further, the inner fixing part of the first diaphragm abuts against the second frame.

Further, the bottom plate is provided with a through hole enclosed by an inner edge wall of the bottom plate, the bending wall extends from the inner edge wall.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure.

DETAILED DESCRIPTION OF THE EMBODIMENTS

The present disclosure will hereinafter be described in detail with reference to the embodiments. To make the technical problems to be solved, and technical solutions and beneficial effects of the present disclosure more apparent, the present disclosure is described in further detail together with the figures and the embodiments. It should be understood the embodiments described hereby are only to explain the disclosure, not intended to limit the disclosure.

Figure 1:
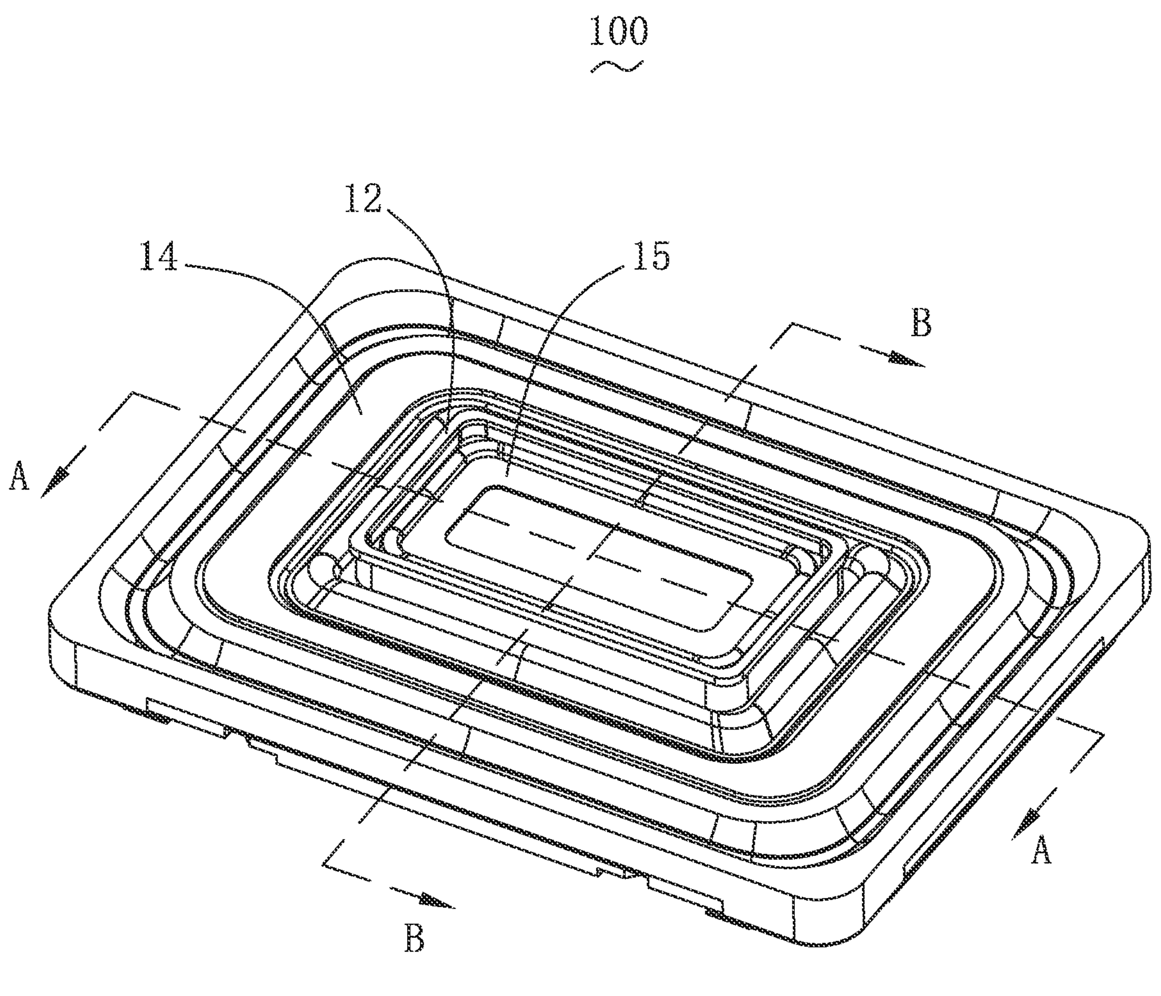
FIG. 1 is an isometric view of a coaxial speaker in accordance with an exemplary embodiment of the present disclosure.
Figure 2:
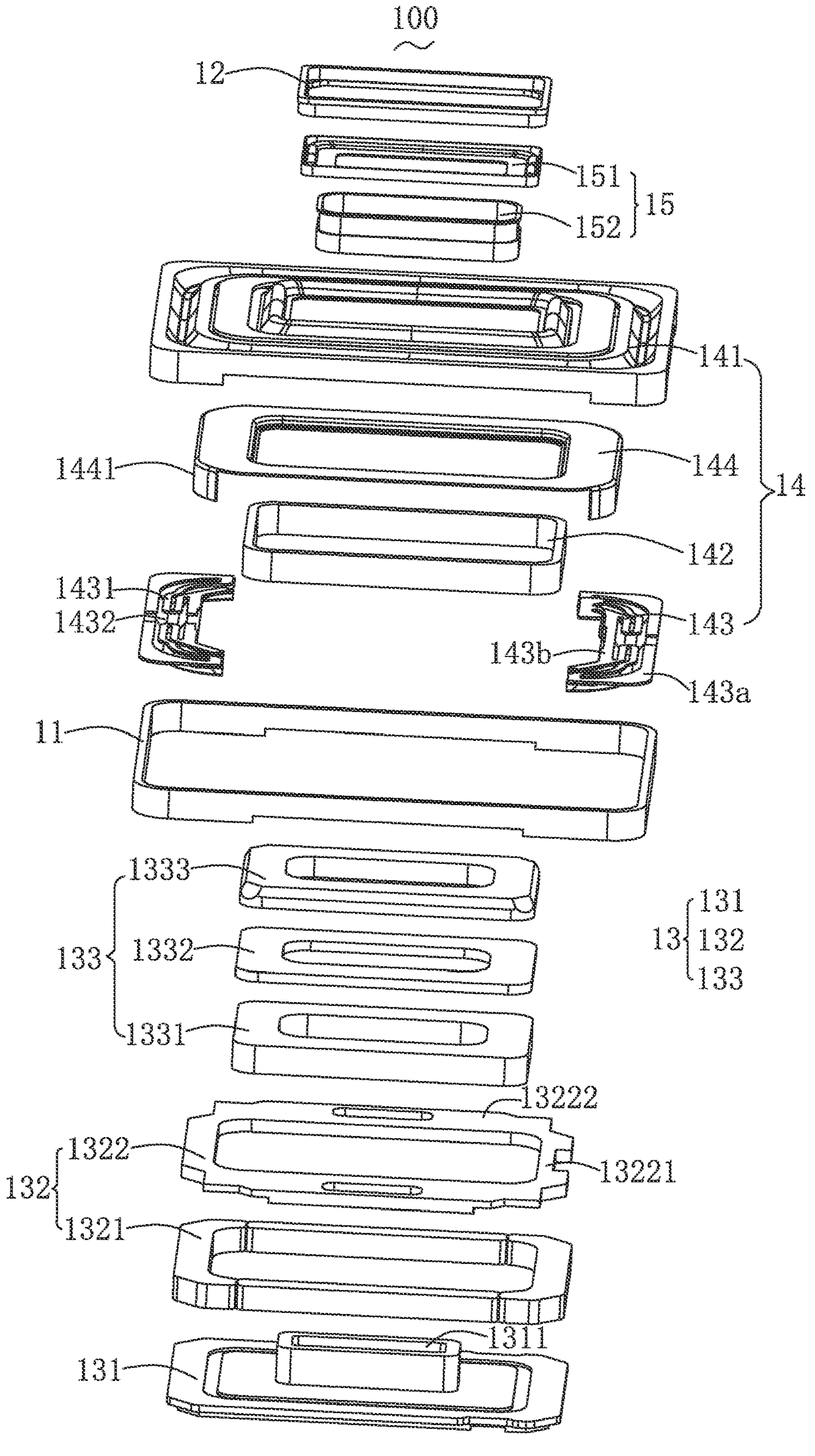
FIG. 2 is an exploded view of the coaxial speaker in FIG. 1.
Figure 3:
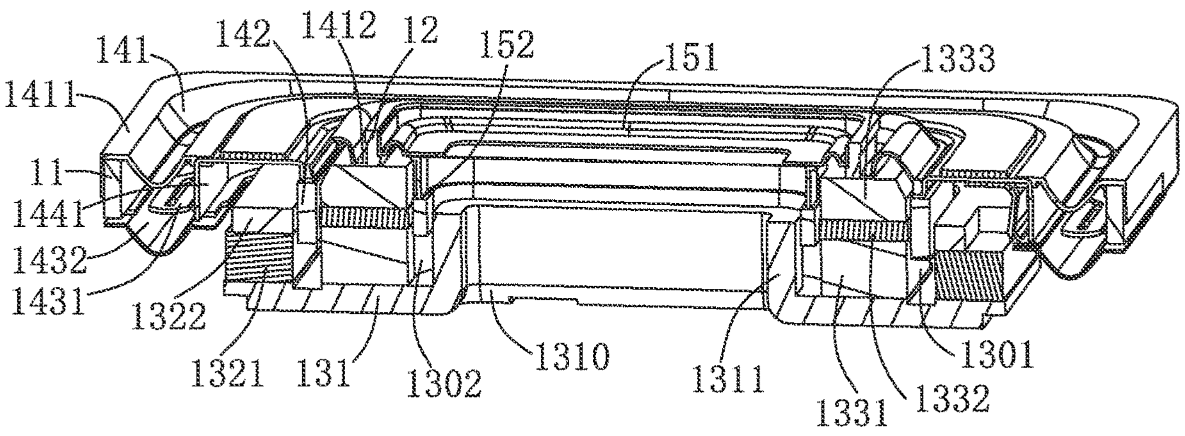
FIG. 3 is a cross-sectional view of the coaxial speaker, taken along line A-A in FIG. 1.
Figure 4:
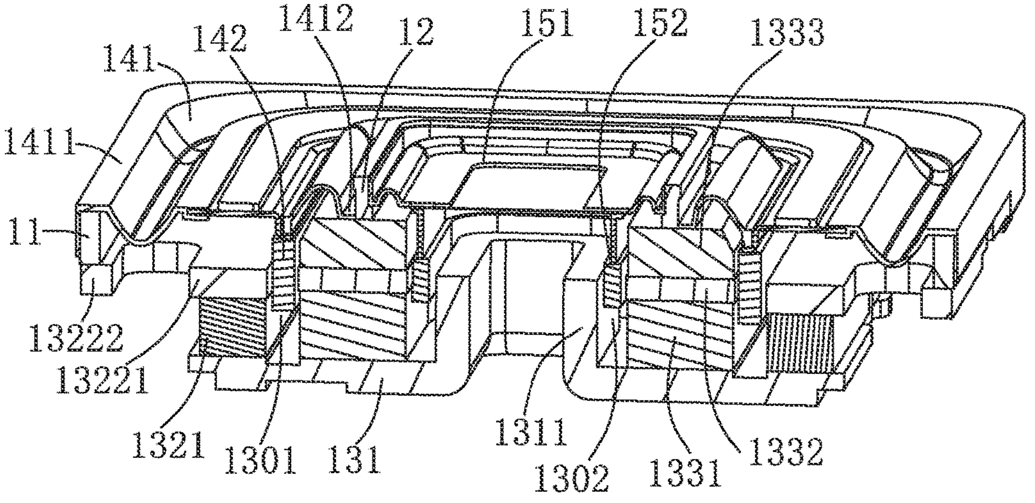
FIG. 4 is a cross-sectional view of the coaxial speaker, taken along line B-B in FIG. 1.

Referring to FIGS. 1-4, the present disclosure discloses a coaxial speaker 100 including a first frame 11, a second frame 12, a magnetic circuit system 13, a first sounding unit 14 and a second sounding unit 15 coaxial with the first sounding unit 14.

The first sounding unit 14 surrounds the second sounding unit 15. The first sounding unit 14 includes a first diaphragm 141 and a first voice coil 142 driving the first diaphragm 141 for vibrating and emitting sounds. The second sounding unit 15 includes a second diaphragm 151 and a second voice coil 152 driving the second diaphragm 151 for vibrating and emitting sounds.

The magnetic circuit system 13 includes a bottom plate 131, a first magnetic unit 132 and a second magnetic unit 133. The first magnetic unit 132 is arranged on an outer side of the second magnetic unit 133 and spaced apart from the second magnetic unit 133 for forming a first magnetic gap 1301. The first voice coil 142 locates in the first magnetic gap 1301. The first magnetic unit 132 includes a first magnet 1321 disposed on the bottom plate 131 and a first yoke 1322 attached to the first magnet 1321. The second magnetic unit 133 includes a second magnet 1331 in an annular shape disposed on the bottom plate 131, a second yoke 1332 in an annular shape attached to the second magnet 1331, and a third magnet 1333 in an annular shape attached to the second yoke 1332. The bottom plate 131 is provided with a bending wall 1311 locating inside the second magnetic unit 133. The bending wall 1311 is spaced apart from the second magnetic unit 133 for forming a second magnetic gap 1302. The second voice coil 152 locates in the second magnetic gap 1302. The first yoke 1322 includes a main body part 13221 attached to a surface of the first magnet 1321 and an extension part 13222 extending from the main body part 13221 in a direction away from the second magnetic unit 133, an amount of the extension parts 13222 is two, the two extension parts 13222 are respectively arranged on two opposite long-axis sides of the coaxial speaker 100.

The first frame 11 is fixed to the two extension parts 13222. The second frame 12 is fixed to the third magnet 1333. An outer fixing part 1411 of the first diaphragm 141 is fixed to the first frame 11, an inner fixing part 1412 of the first diaphragm 141 is fixed to the third magnet 1333. The second diaphragm 151 is fixed to the second frame 12.

The first sounding unit 14 further includes an elastic supporting member 143 opposite to and spaced apart from the first diaphragm 141, and a skeleton 144 connected between the first diaphragm 141 and the elastic supporting member 143, an amount of the elastic supporting members 143 is two, the two elastic supporting members 143 are respectively arranged on two opposite short-axis sides of the coaxial speaker 100. The skeleton 144 includes two supporting arms 1441 respectively fixed to the two elastic supporting members 143, each supporting arm 1441 is arranged between the first frame 11 and the first magnetic unit 132. An outer fixing portion **143*a* of each elastic supporting member 143 is fixed to the first frame 11, an inner fixing portion 143*b* of each elastic supporting member 143 is fixed to a corresponding one of the two supporting arms 1441**.

Each elastic supporting member 143 includes a flexible printed circuit board 1431 fixed to a corresponding one of the two supporting arms 1441 and an auxiliary diaphragm 1432 fixed to a bottom surface of the flexible printed circuit board 1431 away from the first diaphragm 141. The first voice coil 142 is electrically connected to an external power supply through the flexible printed circuit board 1431.

The inner fixing part 1412 of the first diaphragm 141 abuts against the second frame 12, that is beneficial to adjust concentricity of the first diaphragm 141 and the second diaphragm 151.

The bottom plate 131 is provided with a through hole 1310 enclosed by an inner edge wall of the bottom plate 131, the bending wall 1311 extends from the inner edge wall. The through hole 1310 communicates with a column hole enclosed by the bending wall 1311. An insert for electrically connecting the second voice coil 152 with an external power supply can be arranged in the communication area. Optionally, the communication area can also contain other functional insert such as sound-absorbing materials and thermal conduction materials for achieving different functional purposes.

The first sounding unit 14 and the second sounding unit 15 of the coaxial speaker 100 are arranged coaxially, and the first sounding unit 14 surrounds the second sounding unit 15, thereby reducing a product height. The magnetic circuit system 13 includes the bottom plate 131, the first magnetic unit 132 and the second magnetic unit 133 spaced apart from the first magnetic unit 132 for forming the first magnetic gap 1301 for the first sounding unit 14, and the bottom plate 131 is provided with a bending wall 1311 locating inside the second magnetic unit 133 and spaced apart from the second magnetic unit 133 for forming the second magnetic gap 1302 for the second sounding unit 15, thereby improving structural utilization of the magnetic circuit system 13 and reducing a magnetic circuit system cost.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A coaxial speaker, comprising:

a magnetic circuit system comprising:

a bottom plate;

a first magnetic unit comprising a first magnet disposed on the bottom plate and a first yoke attached to the first magnet; and a second magnetic unit arranged on an inner side of the first magnetic unit and spaced apart from the first magnetic unit for forming a first magnetic gap, comprising a second magnet in an annular shape disposed on the bottom plate, a second yoke in an annular shape attached to the second magnet, and a third magnet in an annular shape attached to the second yoke, wherein, the bottom plate is provided with a bending wall locating inside the second magnetic unit, the bending wall is spaced apart from the second magnetic unit for forming a second magnetic gap, the first yoke comprises a main body part attached to a surface of the first magnet and an extension part extending from the main body part in a direction away from the second magnetic unit;

a first sounding unit comprising a first diaphragm and a first voice coil locating in the first magnetic gap and driving the first diaphragm for vibrating and emitting sounds;

a second sounding unit coaxial with and surrounded by the first sounding unit, comprising a second diaphragm and a second voice coil locating in the second magnetic gap and driving the second diaphragm for vibrating and emitting sounds;

a first frame fixed to the extension part and supporting the first diaphragm, wherein, an outer fixing part of the first diaphragm is fixed to the first frame, an inner fixing part of the first diaphragm is fixed to the third magnet; and a second frame fixed to the third magnet and supporting the second diaphragm, wherein, the inner fixing part of the first diaphragm abuts against the second frame.

2. The coaxial speaker as described in claim 1, wherein the first sounding unit further comprises an elastic supporting member opposite to and spaced apart from the first diaphragm, and a skeleton connected between the first diaphragm and the elastic supporting member, an amount of the extension parts is two, the two extension parts are respectively arranged on two opposite long-axis sides of the coaxial speaker, an amount of the elastic supporting members is two, the two elastic supporting members are respectively arranged on two opposite short-axis sides of the coaxial speaker, the skeleton comprises two supporting arms respectively fixed to the two elastic supporting members, each supporting arm is arranged between the first frame and the first magnetic unit, an outer fixing portion of each elastic supporting member is fixed to the first frame, an inner fixing portion of each elastic supporting member is fixed to a corresponding one of the two supporting arms.

3. The coaxial speaker as described in claim 2, wherein each elastic supporting member comprises a flexible printed circuit board fixed to a corresponding one of the two supporting arms and an auxiliary diaphragm fixed to a bottom surface of the flexible printed circuit board away from the first diaphragm.

4. The coaxial speaker as described in claim 1, wherein the bottom plate is further provided with a through hole enclosed by an inner edge wall of the bottom plate, the bending wall extends from the inner edge wall.

* * * * *